United States Patent Office 3,542,845
Patented Nov. 24, 1970

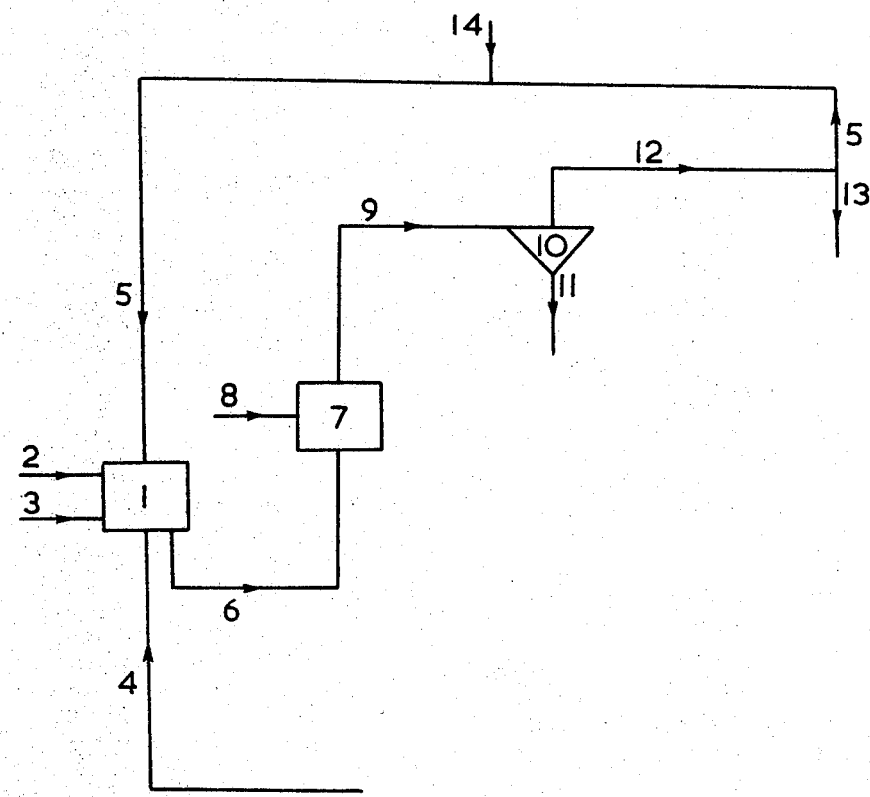

3,542,845
AMALGAM PROCESS FOR PRODUCING ADIPONITRILE FROM ACRYLONITRILE
Gordon Diprose, Runcorn, England, assignor to Imperial Chemical Industries Limited, Millbank, London, England, a corporation of Great Britain
Filed Feb. 19, 1968, Ser. No. 706,345
Claims priority, application Great Britain, Mar. 14, 1967, 11,952/67
Int. Cl. C07c *121/20, 121/26*
U.S. Cl. 260—465.8                             8 Claims

ABSTRACT OF THE DISCLOSURE

In a process in which alpha-beta-mono-olefinic nitriles or carboxylates are converted to their hydrodimers in a continuous manner by reacting with an alkali or alkaline earth metal amalgam and a proton source in a major proportion of polar organic solvent at a pH of 7 to 11.5 maintained by addition of an acidic buffering agent, and in which a suspension of the metal salt (formed from the acidic buffering agent and the metal of the amalgam) is maintained in the reaction mixture in the reaction zone and a part of the said suspension is recycled to the reaction zone and another part is withdrawn, separation of the said metal salt from the hydrodimer in the withdrawn portion is achieved by treating the withdrawn portion with water and/or a non-polar organic solvent to form an organic phase containing the hydrodimer and an aqueous phase containing the said metal salt.

This invention relates to a process for the hydrodimerisation of alpha-beta-mono-olefinic nitriles or carboxylates.

In U.S. application Ser. No. 579,885, filed Sept. 16, 1966 there is described a hydrodimerisation process wherein an amalgam is interacted with a reaction medium comprising the alpha-beta-mono-olefinic starting material, a proton source and a polar organic solvent. The apparent pH of the reaction medium is preferably maintained in the range 7 to 11.5 by addition of an acidic buffering agent; an especially preferred buffering agent is carbon dioxide.

The use of an acidic buffering agent leads to the formation of a salt or salts of the metal component of the amalgam and these salts must subsequently be separated from the other components of the reaction mixture; thus when the amalgam is sodium amalgam and carbon dioxide is employed as buffering agent the predominant salt formed is sodium bicarbonate.

When the reaction medium comprises a major proportion of a polar organic solvent the metal salt is usually precipitated in the form of extremely fine particles and the physical form of the precipitate can cause difficulties in the subsequent separation thereof.

It is desirable to provide improved control over the physical form of the separated salt while allowing flexibility in the choice of the composition of the reaction medium in the hydrodimerisation stage and of the reaction conditions in the said stage.

According to the present invention there is provided a continuous process for the production of a hydrodimer of an alpha-beta-mono-olefinic nitrile or carboxylate wherein an alkali or alkaline-earth metal amalgam is interacted with a non-amalgam phase comprising the said nitrile or carboxylate, a proton source and a major proportion by weight of polar organic solvent, the apparent pH being maintained in the range 7 to 11.5 by addition of an acidic buffering agent, a suspension of the alkali or alkaline-earth metal salt (formed from the acidic buffering agent and the metal of the amalgam) being maintained within the reaction zone, a portion of the non-amalgam phase containing the said metal salt in suspension being recycled to the reaction zone and another portion of the non-amalgam phase containing the said metal salt in suspension being treated with water and/or a non-polar organic solvent to form an organic phase containing the hydrodimer and an aqueous phase containing the said metal salt.

The process is especially applicable to the manufacture of adiponitrile by the hydrodimerisation of acrylonitrile. Other alpha-beta-mono-olefinic nitriles may be used as starting materials, including alkenyl nitriles containing up to 4 carbon atoms in the alkenyl group. Alpha-beta-mono-olefinic carboxylates which may be used as starting materials include esters of alpha-beta-mono-olefinic mono- or di-carboxylic acids with alkanols containing up to 4 carbon atoms, for example methyl acrylate and ethyl acrylate.

The preferred amalgam is sodium or potassium amalgam, as these are readily available; other alkali-metal amalgams, and alkaline-earth metal amalgams may be used, however.

The proton source is preferably water although lower alcohols (for example methanol and ethanol) which do not themselves react with acrylonitrile to form undesired by-products may be used; mixtures of water and alcohols may also be used.

The process is preferably carried out in the presence of a salt capable of forming alkylated cations in the non-amalgam phase; suitable salts are, for example, those described in the specification of Netherlands application No. 6504863. Thus the salt may form alkylated ammonium, phosphonium or sulphonium cations, for example tetra-alkyl amonium ions, tetra-alkyl phosphonium ions, or tri-alkyl sulphonium ions. The preferred salts are tetra-alkyl ammonium salts and especially preferred are tetra-alkyl ammonium salts in which the N-atom is attached to 3 or 4 lower alkyl groups, for example groups containing from 1 to 4 (preferably 1 or 2) carbon atoms; thus tetra-ethyl ammonium salts and methyl tri-ethyl ammonium salts are among the preferred salts. The salt may comprise the alkylated cation in association with a wide variety of anions; halides and p-toluene sulphonates are preferred on solubility grounds.

The polar organic solvent should be unreactive towards the other components of the non-amalgam phase and towards the amalgam. Suitable solvents include acetonitrile, dioxan, dimethylacetamide, dimethylformamide, dimethyl sulphoxide and tetrahydrofuran. The hydrodimer product (for example adiponitrile) may itself be regarded as a polar organic solvent and the hydrodimer content of the recycled mixture is to be taken into account in calculating the proportion of total polar organic solvent in the non-amalgam phase.

The salt forming alkylated cations preferably comprises at least 0.2 mole percent of the non-amalgam phase.

The non-amalgam phase preferably contains a proportion of the alpha-beta-mono-olefinic nitrile or carboxylate within the range 2.5 to 20 mole percent, a proportion of the proton source within the range 1 to 30 mole percent, preferably from 2 to 20 mole percent, and a proportion of salt forming alkylated cations within the range 0.2 to 8 mole percent, the remainder consisting essentially of polar organic solvent.

The proportions of the components of the non-amalgam phase are calculated excluding the metal salt suspended in the said phase.

The term "pH" as applied to the non-amalgam phase denotes the apparent pH measured using conventional instruments or indicators; the apparent pH may not have the same significance in terms of hydrogen ion concentration as in wholly aqueous systems but is a convenient measure of the degree of alkalinity of the non-amalgam phase.

The preferred acidic buffering agent is carbon dioxide, which dissolves in the non-amalgam phase to provide a well-distributed reserve of acid for the neutralisation of the alkalinity generated upon decomposition of the amalgam in the hydrodimerisation process. Other acidic buffering agents forming, with the metal of the amalgam, salts precipitated in the non-amalgam phase may also be used, for example phosphoric acid.

The hydrodimerisation reaction is conveniently carried out at substantially atmospheric pressure but a wide range of pressure and temperature may be used, depending upon the particular olefinic starting material and upon the solvent employed. In general, it is preferred to carry out the reaction at a temperature within the range from 10° C. to 55° C., a temperature range of from 30° C. to 45° C. being preferred. The reaction is exothermic and the reaction temperature may conveniently be controlled by adjusting the rate of introduction of reactants.

Intimate contact between the amalgam and the non-amalgam phase is desirable and this may be achieved using a reactor wherein the amalgam is dispersed throughout the non-amalgam phase by causing the non-amalgam phase to pass upwardly through a reaction zone into which fresh amalgam is continuously supplied. The reaction may be carried out, for example, in the apparatus described in Netherlands application No. 6617641.

The rate of introduction of reactants is arranged so that substantially all the amalgam is decomposed in the reaction zone. The mercury formed (and any residual amalgam) is separated from the rest of the mixture leaving the reaction zone, for example by a cyclone separator.

The recycling of the portion of the mixture leaving the reaction zone may be carried out as described in copending U.S. application Ser. No. 706,402, filed on even date herewith, thus it is preferred to recycle at least 1 part by weight of the mixture leaving the reaction zone for each part by weight removed for separation of hydrodimer and metal salt (the proportion recycled is calculated from the weight of mixture excluding any mercury present). It is especially preferred to recycle at least 5 parts by weight (for example 10 to 100 parts) of the mixture leaving the reaction zone for each part by weight removed. (The proportion of recycle of the non-amalgam phase is calculated excluding the sodium bicarbonate suspended in the said phase.)

The treatment of the portion of the mixture which is not recycled comprises addition of water and/or a non-polar organic solvent in proportions giving separation of an organic phase and an aqueous phase; suitable non-polar organic solvents include aromatic hydrocarbons, for example xylene and toluene.

The separated aqueous phase obtained by the said treatment may contain the metal salt wholly in solution or partly in suspension. When the salt is in solution in the separated aqueous phase the said salt may be obtained as a solid in the desired physical form, for example by crystallisation under controlled temperature conditions. When the salt is partly in suspension in the separated aqueous phase it is preferred to bring the salt into solution by raising the temperature of the separated aqueous phase and/or adding water thereto, the solid salt subsequently being obtained by crystallisation from the said solution under controlled temperature conditions.

The separated organic phase may be distilled to recover (a) the hydrodimer product, (b) the non-polar organic solvent used in the organic phase/aqueous phase separation, (c) any unreacted olefinic starting material and the polar organic solvent added in the hydrodimerisation reaction. The unreacted olefinic starting material and the polar organic solvent may be recycled to the reactor.

By hydrogenation of adiponitrile hexamethylenediamine is obtained. The latter is a valuable intermediate for the manufacture of synthetic linear polyamides (suitable for melt spinning into fibres) by polycondensation with dicarboxylic acids, especially with adipic acid which gives polyhexamethylene adipamide (nylon 6, 6).

The invention is illustrated but not limited by the following examples in which all parts, unless otherwise stated, are by weight.

EXAMPLE 1

FIG. 1 is a diagrammatic flowsheet of one embodiment of the invention. The mixing vessel 1 is continuously fed with acrylonitrile (5.2 parts/hour including recycled acrylonitrile) through line 2, with acetonitrile (37.5 parts/hour including recycled acetonitrile) through line 3, with a 41% w./w. solution of methyl triethyl ammonium chloride in water (5.8 parts/hour) through line 4, and with a recycled mixture of reaction products containing sodium bicarbonate in suspension (1600 parts/hour) through line 5. Carbon dioxide is introduced through line 14 to line 5. The resulting mixture flows through line 6 into the hydrodimerisation reactor 7 where it passes upwardly through a reaction zone into which sodium amalgam (650 parts/hour) is continuously fed through line 8. The sodium amalgam contains 2 parts sodium per 1002 parts total amalgam. The average residence time of the mixture in the reactor is 2 seconds. The rate of introduction of $CO_2$ is controlled to maintain an apparent pH in the reaction zone of 8.5. The heat evolved in the reaction is such that the temperature of the mixture of reaction products (containing sodium bicarbonate in suspension) is 40° C. The mixture is passed along line 9 to the cyclone separator 10 where entrained mercury is separated and removed through line 11. After removal of mercury, the mixture of reaction products (containing sodium bicarbonate in suspension) is passed along line 12 and is then split into two portions, 1600 parts/hour being returned along line 5 to the mixing vessel 1 and 52 parts/hour being bled-off through line 13 for separation of sodium bicarbonate and recovery of the product adiponitrile.

On establishment of steady state conditions, the mixture passing along line 12 (and hence along line 13) consists of 10 parts sodium bicarbonate in suspension in 100 parts of non-amalgam phase, the non-amalgam phase comprising the following:

| | Percent w./w. |
|---|---|
| Acetonitrile | 79.2 |
| Adiponitrile | 5.8 |
| Acrylonitrile | 5.0 |
| Methyl triethyl ammonium chloride | 5.0 |
| Water | 5.0 |

200 ml. of the said suspension (containing 15.6 g. sodium bicarbonate) are mixed with 52 ml. of a 20% w./w. aqueous solution of methyl triethyl ammonium chloride in water (previously saturated with respect to sodium bicarbonate) and 158 ml. of xylene. The mixture is allowed to separate into an upper layer of organic phase (320 ml.) and a lower layer of aqueous suspension (83 ml. containing 15.6 g. sodium bicarbonate in suspension), the said phase separation being carried out at 21.3° C.

The separated organic phase is suitable for treatment by distillation to recover (a) the product adiponitrile, (b) xylene which may be recycled for use in the phase separation and (c) acetonitrile and unreacted acrylonitrile which may be recycled to the mixing vessel 1.

Sodium bicarbonate may be recovered from the separated aqueous suspension for example by treating with water and heating followed by recrystallisation under controlled temperature conditions and subsequent separation of sodium bicarbonate by filtration. The aqueous phase obtained after separation of sodium bicarbonate is suitable for providing as required (a) a source of water for use in the phase separation, (b) a source of water for treating the aqueous suspension of sodium bicarbonate obtained from the phase separation and (c) an aqueous solution containing methyl triethyl ammonium chloride to recycle to the mixing vessel 1 through line 4.

EXAMPLE 2

The apparatus described in Example 1 is operated with the same starting materials, but conditions are adjusted so that the mixture passing along line 12 (and hence along line 13) consists of 25 parts of sodium bicarbonate in 100 parts of non-amalgam phase, the non-amalgam phase comprising the following:

| | Percent w./w. |
|---|---|
| Acetonitrile | 70.0 |
| Adiponitrile | 16.0 |
| Acrylonitrile | 4.0 |
| Methyl triethyl ammonium chloride | 6.0 |
| Water | 4.0 |

200 mls. of the said suspension (containing 38.0 gms. sodium bicarbonate) are mixed with 158 mls. of a 20% w./w. aqueous solution of methyl triethyl ammonium chloride in water (previously saturated with respect to sodium bicarbonate) and 150 mls. of xylene. The mixture is allowed to separate into an upper layer of organic phase (303 ml.) and a lower layer of aqueous suspension (190 mls. containing 38.0 gms. sodium bicarbonate in suspension), the said phase separation being carried out at 21.3° C.

Adiponitrile is recovered from the organic phase by distillation.

EXAMPLE 3

The apparatus described in Example 1 is operated with the same starting materials, but conditions are adjusted so that the mixture passing along line 12 (and hence along line 13) consists of 17.7 parts of sodium bicarbonate in 100 parts of non-amalgam phase, the non-amalgam phase comprising the following:

| | Percent w./w. |
|---|---|
| Acetonitrile | 74.9 |
| Adiponitrile | 11.3 |
| Acrylonitrile | 5.2 |
| Methyl triethyl ammonium chloride | 4.6 |
| Water | 4.0 |

200 mls. of the said suspension (containing 27.6 gms. sodium bicarbonate) are mixed with 112 mls. of a 20% w./w. aqueous solution of methyl triethyl ammonium chloride in water (previously saturated with respect to sodium bicarbonate) and 153 mls. of xylene. The mixture is allowed to separate into an upper layer of organic phase (310 mls.) and a lower layer of aqueous suspension (138 mls. containing 27.6 gms. sodium bicarbonate in suspension), the said phase separation being carried out at 21.3° C.

Adiponitrile is recovered from the organic phase by distillation.

I claim:
1. In a continuous process for the reductive dimerization of acrylonitrile to prepare adiponitrile wherein a liquid reductive dimerization medium containing the acrylonitrile starting material and more than 50% by weight of an inert polar organic solvent is contacted at 10° C. to 55° C. in a reaction zone with an amalgam selected from the group consisting of alkali metal and alkaline earth metal amalgams, the measured pH is maintained in the range 7 to 11.5 by the addition of carbon dioxide whereupon a suspension of alkali metal or alkaline earth metal bicarbonate is formed in the reaction zone by reaction between the carbon dioxide and the metal of the amalgam, reaction mixture is removed from said reaction zone, mercury formed and any residual amalgam are separated from the non-amalgam reaction product containing the adiponitrile and said metal bicarbonate, the non-amalgam reaction product is divided into two portions, one of which is recycled to the reaction zone and the other of which is withdrawn for separation of the bicarbonate and recovery of adiponitrile, at least one part by weight of the non-amalgam reaction product being recycled for each part by weight withdrawn, the modification wherein the portion which is withdrawn is treated with water or a nonpolar aromatic hydrocarbon, or a mixture thereof to form an organic phase containing adiponitrile and an aqueous phase containing the said metal bicarbonate, and the organic and aqueous phases are separated.

2. The process of claim 1 in which the separated aqueous phase contains the bicarbonate wholly in solution and the bicarbonate is obtained as a solid by crystallisation.

3. The process of claim 1 in which the separated aqueous phase contains the bicarbonate partly in suspension, the bicarbonate is brought into solution by raising the temperature of the separated aqueous phase or adding water thereto, or a combination thereof, and the bicarbonate is obtained as a solid by crystallisation.

4. The process of claim 1 in which the separated organic phase is distilled to recover the adiponitrile product.

5. The process of claim 4 in which the aromatic hydrocarbon is added for phase separation and the said hydrocarbon is recovered from the separated organic phase on distillation.

6. The process of claim 1 in which the non-amalgam phase contains 0.2 mole percent of a salt capable of forming alkylated cations.

7. The process of claim 6 in which the non-amalgam phase contains a proportion of the said nitrile within the range 2.5 to 20 mole percent, a proportion of a proton source within the range 1 to 30 mole percent and a proportion of the salt capable of forming alkylated cations within the range 0.2 to 8 mole percent, the remainder consisting essentially of inert polar organic solvent.

8. A continuous process according to claim 1 for the manufacture of adiponitrile from acrylonitrile which comprises reacting sodium amalgam in a reaction zone with a non-amalgam phase containing from 2.5 to 20 mole percent of acrylonitrile, from 2 to 20 mole percent of water and from 0.2 to 8 mole percent of a tetraalkyl ammonium salt in which the N-atom is attached to at least three lower alkyl groups, the remainder consisting essentially of inert polar organic solvent, at a measured pH which is maintained in the range 7 to 11.5 by addition of carbon dioxide, and at a temperature of from 30 to 45° C., the sodium bicarbonate formed by reaction of the carbon dioxide and the sodium remaining in suspension in the reaction mixture at a concentration of from 5 to 20% by weight, separating the mercury and any residual amalgam from the non-amalgam reaction product, withdrawing a portion of the non-amalgam reaction product containing the sodium bicarbonate in suspension, adding a non-polar aromatic hydrocarbon solvent to the withdrawn portion in an amount which effects separation of the organic and aqueous phases, separating the organic and aqueous phases, distilling the organic phase to recover adiponitrile and polar organic solvent, and recycling the remainder of the non-amalgam reaction product to the reaction zone, from 10 to 100 parts of the non-amalgam reaction product being recycled for each part withdrawn.

References Cited
UNITED STATES PATENTS 3,458,559   7/1969   Holland et al. _____ 260—465.8

JOSEPH P. BRUST, Primary Examiner

U.S. Cl. X.R.

260—485